United States Patent
Zukawa et al.

(10) Patent No.: US 7,468,145 B2
(45) Date of Patent: Dec. 23, 2008

(54) PHOSPHOR AND TREATMENT METHOD FOR THE SAME

(75) Inventors: Takehiro Zukawa, Katano (JP); Masatoshi Kitagawa, Hirakata (JP); Masaharu Terauchi, Nara (JP); Junko Asayama, Toyonaka (JP)

(73) Assignee: Panasonic Corporation, Osaka (JP)

( * ) Notice: Subject to any disclaimer, the term of this patent is extended or adjusted under 35 U.S.C. 154(b) by 631 days.

(21) Appl. No.: 10/528,589

(22) PCT Filed: Oct. 7, 2003

(86) PCT No.: PCT/JP03/12818

§ 371 (c)(1),
(2), (4) Date: Mar. 21, 2005

(87) PCT Pub. No.: WO2004/031323

PCT Pub. Date: Apr. 15, 2004

(65) Prior Publication Data
US 2005/0277570 A1 Dec. 15, 2005

(30) Foreign Application Priority Data
Oct. 7, 2002 (JP) ............................. 2002-293857
Oct. 9, 2002 (JP) ............................. 2002-296226

(51) Int. Cl.
*C09K 11/08* (2006.01)
(52) U.S. Cl. ............... 252/301.4 R; 252/301.4 H; 252/301.4 P; 252/301.4 F; 252/301.6 R; 252/301.6 F; 252/301.6 P; 252/301.5; 428/403; 428/404; 428/690; 313/582; 313/584; 313/486
(58) Field of Classification Search ...... 252/301.4 R–301.6 P; 313/582, 584, 486; 428/403, 404; 427/569, 427/579, 582, 589, 585, 215, 248.1
See application file for complete search history.

(56) References Cited

U.S. PATENT DOCUMENTS

| 6,686,043 | B1 | 2/2004 | Fan et al. |
| 7,161,298 | B2* | 1/2007 | Kawamura et al. ........... 313/582 |
| 7,176,627 | B2* | 2/2007 | Sugimoto et al. ............ 313/582 |
| 7,183,705 | B2* | 2/2007 | Aoki et al. ................... 313/486 |
| 7,192,325 | B2* | 3/2007 | Sugimoto et al. ............. 445/24 |
| 7,204,939 | B2* | 4/2007 | Sugimoto et al. ..... 252/301.4 R |
| 7,223,987 | B2* | 5/2007 | Sugimoto et al. ......... 250/484.4 |

FOREIGN PATENT DOCUMENTS

EP     0 046 945     3/1982

(Continued)

*Primary Examiner*—C. Melissa Koslow

(57) ABSTRACT

The present invention aims at realizing a PDP and a mercury-free fluorescent lamp feasible to maintain excellent luminescent characteristics over long periods by suppressing time-lapse changes in luminescent characteristics of a phosphor that is excited by vacuum ultraviolet light to thereby emit light. To accomplish this object, the oxide phosphor of the invention comprises individual particles, each of which has a region at and near the surface thereof modified, and the elemental composition of the surface region is in a more oxidized state than that of the internal region of the particles. Alternatively, the surface region has more halogen or chalcogen in the elemental composition. In the phosphor treatment method of the invention, the surface region of individual phosphor particles is selectively modified by (i) forming a highly reactive gas atmosphere by exciting gas which contains reactive gas, and (ii) exposing the phosphor to the gas atmosphere.

9 Claims, 9 Drawing Sheets

FOREIGN PATENT DOCUMENTS

| | | |
|---|---|---|
| EP | 0 312 383 A1 | 4/1989 |
| JP | 52-151555 A | 12/1977 |
| JP | 01-129090 A | 5/1989 |
| JP | 06-184533 A | 7/1994 |
| JP | 06-267697 | 9/1994 |
| JP | 08-031325 | 2/1996 |
| JP | 09-104863 | 4/1997 |
| JP | 09-310067 A | 12/1997 |
| JP | 10-245550 A | 9/1998 |
| JP | 11-181418 A | 7/1999 |
| JP | 2000-96044 | 4/2000 |
| JP | 2002-235074 A | 8/2002 |
| JP | 2003-082345 | 3/2003 |
| WO | WO 03/025090 * | 3/2003 |

* cited by examiner

PHOSPHOR AND TREATMENT METHOD FOR THE SAME

TECHNICAL FIELD

The present invention relates to phosphors used for light-emitting elements, in particular to phosphors capable of being excited by vacuum ultraviolet light and used for plasma display panels (PDP) and mercury-free fluorescent lamps.

BACKGROUND ART

An AC-driven surface discharge PDP having a three-electrode structure is known as a PDP suitable for a full color display using three color phosphors.

FIG. 9 is a schematic cross-sectional diagram showing a structure of a common AC-driven surface discharge PDP.

The PDP shown in the drawing comprises a front glass substrate 1 and a rear glass substrate 5, which are disposed parallel to one another. Formed on the front glass substrate 1 are display electrodes 2 that are covered by a dielectric glass layer 3 and a magnesium oxide (Mgo) dielectric protective layer 4 (see, for example, Patent Reference 1).

On the rear glass substrate 5, on the other hand, address electrodes 6 and barrier ribs 7 are disposed, and phosphor layers 9-11 of respective colors (red, green, and blue), which are composed of oxide phosphors, are each provided in the space between two adjacent barrier ribs 7.

The front glass substrate 1 as formed above is disposed on the barrier ribs 7 arranged on the rear glass substrate 5, and discharge gas is filled between these substrates 1 and 5 to form a discharge space 8.

In this PDP, vacuum ultraviolet light (predominantly, a wavelength of 147 nm) is generated through an electric discharge, and the phosphor layers 9-11 of three colors are excited to thereby emit light, which results in a display in colors.

The above PDP can be manufactured as follows.

A silver paste is applied to the front glass substrate 1, and then fired to form the display electrodes 2. Further, a dielectric glass paste is applied over the display electrodes 2, and then fired to form a dielectric glass layer 3, on which a protective layer 4 is formed.

Onto the rear glass substrate 5, on the other hand, a silver paste is applied and fired to form the address electrodes 6. Next, a glass paste is applied at predetermined intervals, and then fired to form the barrier ribs 7. Subsequently, the phosphor layers 9-11 are formed by respectively applying phosphor pastes of individual colors to the spaces between the barrier ribs 7, and firing the phosphor pastes at around 500° C. to remove resin components and the like therefrom. After this firing process for forming the phosphor layers 9-11, sealing glass frits are applied around the edge of the rear glass substrate 5 to herewith form a sealing glass layer, and calcinated at around 350° C. in order to remove resin components and such from the formed sealing glass layer (frit calcination process).

Then, the front glass substrate 1 and the rear glass substrate 5 are laid on top of each other so that the display electrodes 2 and the address electrodes 6 face at right angles to one another. These superimposed glass substrates are attached and sealed by heating at a temperature (approximately 450° C.) higher than the softening temperature of the sealing glass (sealing process).

Subsequently, as the sealed panel formed of the front and rear glass substrates 1 and 5 is heated up to around 350° C., air is evacuated from the internal space formed between the both glass substrates, i.e. the space which is formed between the front and rear glass substrates 1 and 5, and to which the phosphor layers are exposed (evacuation process) After the evacuation process is completed, discharge gas is introduced to the space until the pressure reaches a predetermined point (normally, 39.9 kPa-66.5 kPa, or 300 Torr-500 Torr).

With such a PDP, there has been a challenge to improve the luminescent characteristics, including the luminance, for example, and to reduce time-lapse changes in luminescent characteristics of the phosphor layers so as to realize an extended quality assurance period.

As to a PDP, in particular, it is sometimes the case that the quality assurance period is determined based on the time-lapse changes in luminescent characteristics of the phosphors used for a luminous display unit of the PDP.

Due, for example, to moisture and application of heat in the PDP manufacturing process, the luminance of phosphors deteriorates and the chromaticity of the phosphors also changes. Thus, the time-lapse changes in phosphors during the PDP manufacturing process leads to degradation of the panel's characteristics. In addition, the phosphor layers are exposed to plasma associated with an electric discharge during the time when the PDP is in operation, which results in further changes in phosphor layers over time. Furthermore, the time-lapse changes in phosphors sometimes lead to deterioration in the PDP's luminescent characteristics over time, which in turn results in the end of the product's life.

This is also the case with a mercury-free fluorescent lamp of which the phosphor layer is excited by vacuum ultraviolet light to emit light. The time-lapse changes in phosphor layer may account for the duration of life.

Under such a circumstance, with light-emitting elements such as a PDP and a mercury-free fluorescent lamp, it is desired to suppress the time-lapse changes in luminescent characteristics of the phosphors caused during the manufacturing process and the time when these light-emitting elements are in operation.

As a technology for suppressing the time-lapse changes in phosphors, a method in which the phosphors are heat-treated (i.e. fired) at a high temperature of approximately 1100° C. to improve the crystallinity is well known.

In addition, in order to suppress deterioration in the phosphor layers, there is a known method in which the surface of phosphor particles is covered with a protective coat made of MgO by using vapor deposition, dipping, sputtering, or spraying techniques as described in Patent Reference 1.

As a method of forming a long lasting phosphor, Patent Reference 2 proposes to supply a coating precursor, e.g. trimethyl aluminum, and mixed gas composed of oxygen and ozone into a reactor vessel, and coat phosphor particles by spending a considerable amount of time.

Patent Reference 1: Japanese Laid-Open Patent Application Publication No. H8-31325
 Patent Reference 2: Japanese Laid-Open Patent Application Publication No. 2000-96044

DISCLOSURE OF THE INVENTION

To cover individual phosphor particles with a protective coat, such as MgO, requires a device like a vacuum evaporator, as in Patent Reference 1 above, which carries an additional cost.

According to the method described in Patent Reference 2, it takes a long time period of 40 to 70 hours to coat the phosphor particles. In addition, when the phosphor particles are processed at a high temperature, the luminescent characteristics tend to degrade although the time-lapse changes of the characteristics are reduced.

The present invention aims at realizing a PDP and a mercury-free fluorescent lamp feasible to maintain excellent luminescent characteristics over a long period of time by suppressing the time-lapse changes in luminescent characteristics of a phosphor which is excited by vacuum ultraviolet light to thereby emit light.

In order to accomplish the above object, an oxide phosphor of the present invention is in particulate form, wherein each particle has a surface region including a vicinity thereof modified so that an elemental composition of the surface region is in a more oxidized state than an elemental composition of an internal region of the particle.

Here, the "surface" means an external surface where no protective layer and the like are formed.

The "surface region including a vicinity" denotes a region within the individual phosphor particles that constitute a phosphor excited by vacuum ultraviolet light, and this region is up to tens of nanometers deep from the surface.

Alternatively, in the oxide phosphor of the present invention, each particle has a surface region including a vicinity thereof modified so that an elemental composition of the surface region includes more halogen or chalcogen than an elemental composition of an internal region of the particle. Here, it is preferable that halogen atoms or chalcogen atoms are chemically bound to the surface region.

The phosphor treatment method of the present invention comprises a step of: selectively modifying a surface region, including a vicinity thereof, of individual phosphor particles that constitute a phosphor by (i) forming a highly reactive gas atmosphere by exciting gas that contains reactive gas, and (ii) exposing the phosphor to the gas atmosphere.

Here, the "reactive gas" is, for example, oxygen, gas composed of halide, or gas composed of chalcogen compounds.

The "surface region including a vicinity" of individual phosphor particles denotes a region over which vacuum ultraviolet light penetrates from the surface of the phosphor particles (tens of nanometers deep from the surface), and a region deeper than this region is referred to as an internal region.

The "highly reactive gas atmosphere" means a gas atmosphere in a phase that is chemically more reactive to the surface of the phosphor as compared to the original gas form. This is, for example, an excited state containing radicals and ions therein. When oxygen (original gas form) is used as the reactive gas, the highly reactive gas atmosphere is a phase of gas containing radical oxygen or ozone, both of which exhibit strong oxidizing properties.

"Selectively modifying a surface region including a vicinity of individual phosphor particles that constitute a phosphor" means that the surface region including the vicinity is modified so that a degree of modification thereof be greater than in the internal region of the particles.

The present invention described above allows to suppress the time-lapse changes in luminescent characteristics, and the reason for this is thought to be as follows.

With an oxide phosphor, elements included in the composition are generally the same to the entire particle. It is considered that luminescent characteristics of the phosphor, however, change over time due to the following factors:

i) moisture adsorption to the surface of the phosphor;
ii) defects in the phosphor crystal structure;
iii) substances other than the phosphor crystals mixed in;
iv) change in crystal structure due to heat application to the phosphor; and v) destruction of the crystal structure caused by exposing the phosphor to plasma associated with an electric discharge.

Against these factors, the present invention described above fills oxygen vacancies in the vicinity-included surface region of the particles of the oxide phosphor, and thereby improves the crystallinity of the phosphor. As a result, the time-lapse changes in luminescent characteristics mainly arisen, among the factors above, from the factor ii (defects in the phosphor crystal structure) can be suppressed.

The occurrence of the factors i and iv (moisture adsorption to the phosphor, and change in crystal structure) is often attributable to the defects in the phosphor crystal structure. With the present invention, however, since the phosphor crystal defects are compensated and thereby crystallinity is improved, the changes over time due to the factors i and iv can be suppressed.

Here, the vicinity-included surface region is selectively modified, and therefore the modification treatment can be processed over a short period of time as compared to the case where the internal region is also modified. As a result, this leads to cost savings, and would reduce the damage which is caused to the phosphor in association with the modification treatment.

A wide variety of gases can be used as introduced gas. By selecting types of gases for use, a specific degradation factor can be eliminated, and furthermore several degradation factors together can be eliminated at once.

In addition, according to the treatment method of the present invention, the modification of the phosphor is realized simply by exposing the phosphor to the introduced gas. Thus, the treatment process is comparatively simple, and does not require an expensive device such as a vacuum evaporator.

It is preferable to use a mixture of reactive gas and either rare gas or inert gas as the introduced gas since this facilitates a formation of the highly reactive gas atmosphere as well as reduces damage caused to the phosphor.

If fluorine forms bonds with the preprocessed phosphor components in the vicinity-included surface region of the phosphor particles, a layer that functions as a protective layer having water repellency is formed near the surface of the phosphor, and thereby the time-lapse changes of the phosphor are further suppressed.

In the case when the phosphor is an alkaline earth metal aluminate phosphor, fluorine can be present, being bound with the alkaline earth metal.

In order to contain fluorine in the vicinity-included surface region of phosphor particles, for example, first fluorinated gas is included in the introduced gas. Then, the introduced gas with the fluorinated gas is excited, and the phosphor is exposed to the excited gas atmosphere.

When a phosphor layer used for a light-emitting element is composed of such an oxide phosphor of the present invention, the phosphor layer also obtains reduced time-lapse degradation of luminescent characteristics.

Here, within each of the phosphor layers, the oxide phosphor of the present invention described above may be disproportionally distributed, with more at and near a surface thereof than in an inner region. In this case also, the characteristics at and near the surface of the phosphor layer are maintained, which results in suppressing the time-lapse degradation of the luminescent characteristics.

Such a light-emitting element can be manufactured by a method comprising a step of: modifying, within each of one or more phosphor layers formed on a substrate, a region at and near a surface thereof by (i) forming a highly reactive gas atmosphere by exciting gas that contains reactive gas, and (ii) exposing the substrate to the gas atmosphere.

In particular, the use of the oxide phosphor of the present invention in phosphor layers of a PDP and a mercury-free fluorescent lamp has a beneficial effect on suppressing the time-lapse degradation of the luminescent characteristics of these light-emitting elements.

A phosphor used for a PDP and a mercury-free fluorescent lamp has an excitation wavelength of mainly 147 nm, which is in the range of the vacuum ultraviolet. Therefore, the vacuum ultraviolet light is absorbed in the vicinity-included surface region of the phosphor particles, and converted to visible light within the region. Accordingly, if the luminescent characteristics of the vicinity-included surface region of the phosphor particles are maintained, the luminescent characteristics of the PDP and mercury-free fluorescent lamp can also be maintained.

Among oxide phosphors, ones that include, in their elemental compositions, a luminescent center metal (e.g. Eu and Mn) possible to have a plurality of valence states generally have excellent luminescent characteristics. Europium-activated oxide phosphors, in particular europium-activated alkaline earth metal aluminate phosphors, exhibit high luminous efficiency in the vacuum ultraviolet range. However, these phosphors are susceptible to the time-lapse changes in luminescent characteristics.

Therefore, applying the present invention to this type of oxide phosphor yields a significant effect.

With this type of oxide phosphor, the time-lapse changes in luminescent characteristics can be suppressed by selectively modifying the vicinity-included surface region of the phosphor particles by making the luminescent center metal in the vicinity-included surface region have a higher average valence as compared to the internal region of the particles.

An oxide phosphor described as $Ba_{1-x}Sr_yEu_zMgAl_{10}O_{17}$, where $0.05 \leq x \leq 0.40$, $0 \leq y \leq 0.25$, $0.05 \leq z \leq 0.30$, and $x-y \leq z$, in particular, exhibits high luminous efficiency in the vacuum ultraviolet range, and is commonly used for PDPs and mercury-free fluorescent lamps. However, such an oxide phosphor is susceptible to the time-lapse changes in luminescent characteristics, and therefore an application of the present invention to the oxide phosphor yields a significant effect. Here, when the europium concentration in the vicinity-included surface region of the phosphor particles is z', it is desirable that (1) a relation in the form of $z \leq z' \leq 5z$ be satisfied, (2) within each of the phosphor particle overall, a proportion of divalent europium to the total amount of europium be no less than 60% but no more than 95%, and (3) in the vicinity-included surface region within each of the particles, the proportion of divalent europium be no less than 5% but no more than 30%, and more preferably no less than 10% but no more than 20%.

It is preferable to implement the phosphor treatment method of the present invention in the following manner.

In order to form the highly reactive gas atmosphere, gas containing reactive gas is excited, and a gas atmosphere in a plasma state is thereby formed. Herewith, the reactive gas is continuously maintained in an excited state, and thereby it is expected to achieve an excellent modification effect.

If the highly reactive gas atmosphere is formed at or close to atmospheric pressure, there is no need for depressurizing the gas atmosphere, which results in a high throughput of the treatment process. As a result, this has an advantage in processing time reduction as well as cost savings.

The introduced gas may be brought into a certain reactive state by applying energy in order to form the highly reactive gas atmosphere.

In this case, when a location at which the energy is applied to the introduced gas is separated from a location at which the processing phosphor is exposed to the highly reactive gas atmosphere, the phosphor is free from damage.

For instance, the gas atmosphere may be formed outside a treatment vessel by (i) introducing the gas containing the reactive gas into the treatment vessel, (ii) applying energy to excite the introduced gas, and (iii) ejecting the excited gas therefrom.

Concrete methods for applying energy to the introduced gas include an application of ultraviolet light. This method allows to form the highly reactive gas even at a low temperature.

It is desirable that the ultraviolet light is applied to the gas containing the reactive gas without illuminating the surface of the phosphor.

As another concrete method for applying energy to the introduced gas, a high-frequency voltage is applied to the introduced gas so as to electrically discharge and thereby become excited.

When the phosphor is exposed to the highly reactive gas atmosphere, the reaction between the phosphor and the reactive gas will be accelerated if the phosphor is in a heated state. Note however that the heating temperature is preferably 300° C. or lower, and more preferably 100° C. or lower.

In the case that the introduced gas includes molecular oxygen, ozone or monatomic oxygen is formed by exciting the introduced gas. Herewith, crystal defects at and near the surface of phosphor crystals can be compensated, and thereby crystallinity of this region is improved. As a result, degradation factors due to crystal defects can be eliminated, and a phosphor having smaller time-lapse changes can be realized.

When a plurality of kinds of phosphors is impregnated with the formed reactive atmosphere, the phosphors may be processed by altering the treatment method for each kind of the phosphors. Degradation factors of phosphors are not uniform, and differ for each kind. Therefore, a treatment appropriate to cope with degradation factors of each phosphor can be conducted by altering treatment parameters, such as types of the introduced gas and the like.

It is often the case that several different types of phosphors are used in a luminaire and an image display device, for example. Here, when it is sought to maintain the luminescent characteristics of these devices, i.e. to maintain a balance of all colors over long period, it is desirable to conduct appropriate treatments for degradation factors of respective phosphors by altering the treatment method for each kind of phosphor.

BEST MODE FOR CARRYING OUT THE INVENTION

The following gives an account of preferred embodiments of the present invention in reference to drawings.

1. First Embodiment

In a first embodiment, source gas is introduced, and a high-frequency voltage is applied to the source gas to electrically discharge and thereby become excited. Due to this excitation, an atmosphere of activated gas having high reactivity is formed. Then, a phosphor composed of phosphor particles is exposed to the reactive atmosphere so as to modify a surface region of the individual phosphor particles including the vicinity.

Here, the source gas includes reactive gas that, when raised to an excited state, becomes highly reactive to the phosphor particles. Oxygen, halogen, gas composed of halide, and gas composed of chalcogen compounds are specific examples of such reactive gas.

1.1 Phosphor Treatment Apparatus

Figure 1:
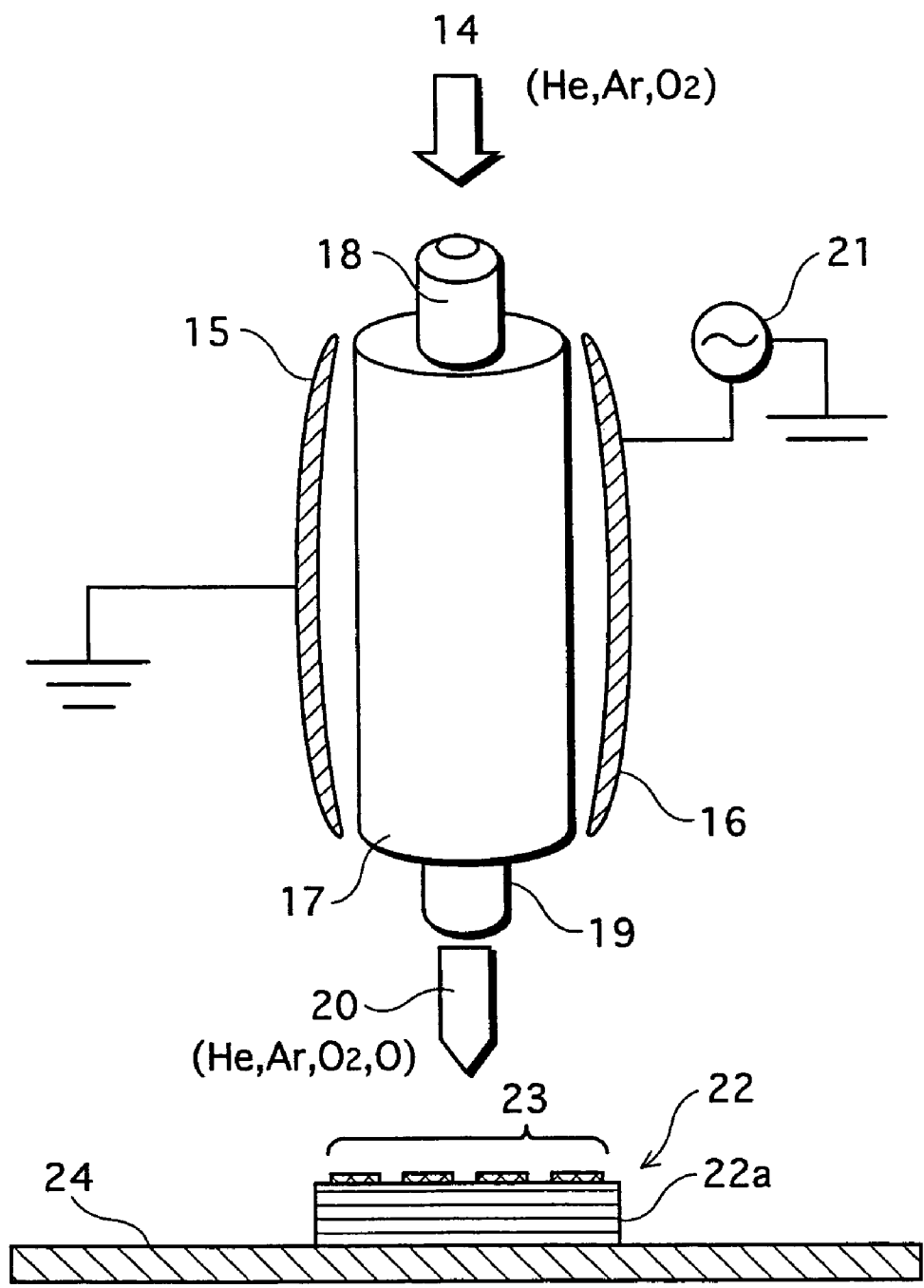
FIG. 1 illustrates a structure of a phosphor treatment apparatus used in the first embodiment for processing a phosphor.

FIG. 1 illustrates a structure of a phosphor treatment apparatus used for processing a phosphor in the first embodiment.

As shown in FIG. 1, in the phosphor treatment apparatus, a reactor vessel 17, in which source gas 14 is excited, is placed between an earth electrode 15 and a high-voltage electrode 16, and a mobile stage 24 for conveying a processing object 22 is disposed in the vicinity of the reactor vessel 17.

The processing object 22 is composed by applying an oxide phosphor onto a substrate 22a to form phosphor layers 23. The processing object 22 is made by mixing, e.g., $BaMgAl_{10}O_{17}:Eu^{2+}$ (BAM), which is a blue phosphor, with a binder, and then applying the mixed substance onto the substrate 22a made of quartz.

A high-frequency power source 21 is connected to the high-voltage electrode 16.

The reactor vessel 17 that is made of a dielectric material is insulated from the earth electrode 15 and the high-voltage electrode 16. Provided in the reactor vessel 17 are a gas inlet 18 used for introducing the source gas 14 including reactive gas, and a gas outlet 19 used for discharging excited gas. Here, a quartz tube is used as the reactor vessel 17.

By driving the high-frequency power source 21, a high frequency electric field is applied to gas introduced into the reactor vessel 17.

It is preferable to use a mixture of reactive gas and either rare gas or inert gas as the source gas 14, although the reactive gas by itself may be used.

Note here that included as members of the rare gas family are helium (He), neon (Ne), argon (Ar), krypton (Kr), xenon (Xe), and radon (Rn), while the inert gas group includes nitrogen ($N_2$) in addition to the above members of the rare gas family.

If included in the introduced source gas, rare gas contributes to the occurrence of an electric discharge in the reactor vessel 17. If reactive gas by itself is used as the source gas 14, a phosphor being processed is susceptible to damage caused by plasma exposure. Therefore, it is preferable to mix inert gas with reactive gas and use the mixture as the source gas 14, which allows to mitigate the plasma damage caused to the phosphor.

Although the inside of the reactor vessel 17 may be either pressurized or depressurized, the modification treatment can also be conducted at or close to atmospheric pressure with using neither a pressure device nor a decompression device. The pressure range of the reactor vessel 17 inside is preferably in the range of 1 kPa to 10 Mpa, and more preferably 10 kPa to 110 kPa.

The mobile stage 24 is able to convey the processing object 22 in any direction along a main plane of the substrate 22a so that the outlet 19 scans the surface of the processing object 22.

1.2 Phosphor Treatment Method and Advantageous Effects

A treatment method for processing the processing object 22 with the use of the above phosphor treatment apparatus is described here.

At the same time when the source gas 14 is introduced into the reactor vessel 17 from the inlet 18, the high-frequency power source 21 is driven.

The processing object 22 is placed on the stage 24, and conveyed in such a manner that the outlet 19 scans the surface of the processing object 22.

Herewith, as the source gas 14 goes through the inside of the reactor vessel 17, energy is given to the gas, that is, a high frequency electric field is applied to the gas. The source gas 14 is thereby excited and activated, and then this activated gas is flown out from the outlet 19. In FIG. 1, a symbol with a reference number of 20 attached denotes the activated gas. Subsequently, the phosphor layers 23 are exposed to the activated gas 20. Since having been brought to a reactive state, the activated gas 20 comes in contact with the surface of individual phosphor particles that constitute the phosphor layer 23, and reacts with the surface region (including the vicinity) within individual particles. Parts where crystal defects have been formed, in particular, readily react with the activated gas 20, and the crystallinity of the vicinity-included surface region of the phosphor particles will be improved by this reaction. The region in the individual phosphor particles is impregnated with the activated gas 20.

FIG. 1 provides an example in which mixed gas composed of: oxygen as the reactive gas; He as the rare gas, which contributes to an electric discharge; and Ar as the inert gas, is used as the source gas 14 to be introduced into the reactor vessel 17, which mitigates plasma damage.

Figure 2:
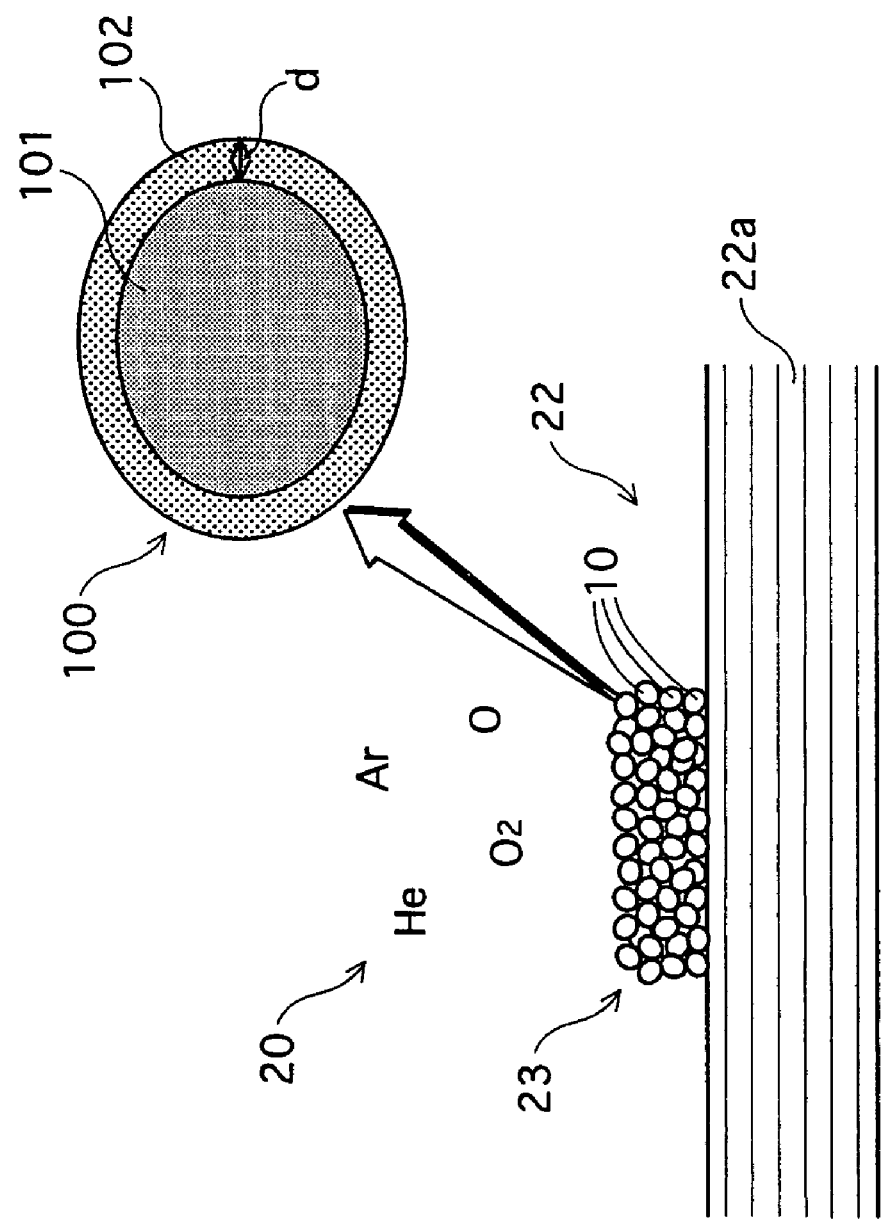
FIG. 2 includes an enlarged view of a phosphor layer 23 on the processing object 22 and a diagrammatic view illustrating a structure of phosphor particles 100 that constitute the phosphor layer 23.

FIG. 2 includes an enlarged view of one phosphor layer 23 formed on the processing object 22 and a diagrammatic view illustrating a structure of processed phosphor particles 100 that constitute the phosphor layer 23.

As shown in FIG. 2, the phosphor layer 23 includes a large number of phosphor particles 100. The activated gas 20 includes activated oxygen (O) in addition to the elements (He, Ar, and $O_2$) composing the source gas 14.

The activated gas 20 reacts with the parts having crystal defects in the vicinity-included surface region. At this point, if carbon atoms are present in the vicinity-included surface region of the phosphor particles 100, the activated oxygen atoms (O) and ozone ($O_3$) are combined with the carbon atoms to form carbon dioxide and such through a radical reaction, for instance. As a result, carbon is excluded from the surface of the phosphor particles 100 and the surrounding.

Consequently, the processed phosphor particles have fewer crystal defects in the vicinity-included surface region, which results in suppressing the time-lapse degradation of the luminescent characteristics.

If impurities produced when the phosphor was synthesized or impurities caught up during a process of forming the phosphor layers are present in the vicinity-included surface region of the phosphor particles, the impurities may trigger accelerating the time-lapse changes in phosphor. Here, however, when the activated gas 20 contacts the phosphor particles, the impurities react with the activated gas 20, and therefore the effect of eliminating these impurities is also anticipated.

The source gas 14 may contain gas including fluorine (fluorinated gas) as the reactive gas. In this case, it is preferable to set the fluorinated gas in the range of 0.1% to 10% of the volume of the source gas 14.

In this particular case, another effect can be obtained in addition to the effect described above. Here, fluorine compounds are formed in a modified portion 102, and a water repellent layer is formed on the surface of the phosphor particles due to the fluorine compounds. As a result, the amount of moisture adsorbed to the phosphor is reduced, which in turn suppresses the time-lapse changes in the phosphor.

Note that in the case where the vapor pressure of the source gas 14 is low at ambient temperatures, the source gas 14 may be heated so as to have a high vapor pressure before being introduced into the reactor vessel 17. Here, the temperature for heating the introduced gas is preferably in the range of 50 to 600° C.

In order to accelerate the reaction of the activated gas 20 with the phosphor 23, a heating medium, for example, may be installed to the stage 24 so that the phosphor layer 23 will be heated in the range of 100 to 300° C. before, during, or after the phosphor layer 23 being exposed to the activated gas 20.

Alternatively, a mechanism for voltage application, for example, may be provided in the stage 24. By using this mechanism at a time when the phosphor layer 23 is exposed to the activated gas 20, the phosphor layer 23 is brought to be positively or negatively charged so that ions in the activated gas 20 are drawn to the phosphor layer 23. With this mechanism, the reaction between the activated gas 20 and the phosphor 23 can also be accelerated.

1.3 Structure of Modified Phosphor Particles and Advantageous Effects

Each of the phosphor particles 100 processed as described above has an unmodified portion 101 in the internal region of the particle, and a modified portion 102 in the vicinity-included surface region of the particle. The modified portion 102 is a portion which has been modified by the activated gas 20, while the unmodified portion 101 has not been modified by the gas.

In the case when oxygen is used as the reactive gas in the phosphor modification treatment, although elements constituting the modified portion 102 are identical with those constituting the unmodified portion 101, the modified portion 102 has a more oxidized form of elemental composition as compared to the unmodified portion 101. Alternatively, when halogen, gas composed of halide, or gas composed of chalcogen compounds is used as the reactive gas, elements of these will be contained in the modified portion 102.

As described above, the modified portion 102 has fewer crystal defects when compared to the corresponding portion of unprocessed particles, and the crystallinity has been improved.

Therefore, the use of the processed phosphor particles 100 in the phosphor layers of display devices and lamps achieves an effect of suppressing the time-lapse changes in phosphor layers. This effect is especially fully realized in a PDP and a mercury-free fluorescent lamp, of which phosphor layers are excited by vacuum ultraviolet light to thereby emit light, because, in these devices, only the vicinity-included surface region of the phosphor particles contributes to the emission.

The following describes considerations related to a thickness d of the modified portion 102.

The thickness d of the modified portion 102 (i.e. a depth of the modified portion 102 from the surface of the particle) is adjustable by changing the length of time to expose the phosphor particles 100 to the activated gas 20. The thickness d becomes larger as the phosphor particles 100 are exposed to the gas for a longer time.

Used for a PDP is a phosphor excited mainly by vacuum ultraviolet light. In such a phosphor, a region to be excited to emit light is, within the individual phosphor particles, up to tens of nanometers deep from the surface. Note however that the depth of this excitation-emission region changes over time to some extent. Consequently, in order to suppress the time-lapse changes in luminescent characteristics of the phosphor, it is desirable that the thickness d of the modified portion 102 in the phosphor particles 100 be set sufficiently large, being more than the depth of the excitation-emission region.

On the other hand, in order to make the thickness d of the modified portion 102 large, the phosphor particles 100 need to be exposed to the activated gas 20 over an extended time period. As a result, the larger the thickness d of the modified portion 102 is to be made, the larger the costs required for the modification treatment.

From these points of view, it is desirable that the thickness d of the modified portion 102 be set in the range of 1 nm to 1 μm, and more preferably 2 nm to 100 nm.

Other than changing the time length for the exposure to the activated gas 20, the thickness d of the modified portion 102 can be also adjusted by changing constituents of the source gas 14 (a ratio between the inert gas and the reactive gas) as well as by changing voltage and frequency of the high-frequency electric field. For instance, the thickness d of the modified portion 102 increases as the ratio of the reactive gas in the source gas 14 is raised.

Accordingly, the thickness d of the modified portion 102 can be adjusted to be in the desirable range by incorporating these parameters.

The phosphor particles 100 each having the modified portion 102 may be distributed to the entire phosphor layer 23, from the surface to the inside. However, it is mainly the surface region of the phosphor layer 23 that, in fact, is excited to thereby emit light when ultraviolet light is radiated to the phosphor layer 23 from the surface side, and not much excitation-emission is produced from the inside of the phosphor layer 23. Accordingly, only the surface of the phosphor layer 23 and the vicinity may be exposed to the activated gas 20 so as to disproportionally distribute the phosphor particles 100 having a modified portion 102, namely, to distribute more to the surface of the phosphor layer 23 and the vicinity than to the inside. In this case also, the effect of suppressing the time-lapse deterioration in the phosphor layer 23 can be fully achieved.

1.4 Preferred Configurations in Modification Treatment

It is thought that the condition in which the source gas 14 is excited will be changed according to parameters such as a type of gas used, a gas flow volume, a gas temperature, and a frequency and an intensity of the applied high-frequency electric field. Here, in order to achieve the modification effect of the phosphor particles, it is desirable that these parameters be adjusted so as to bring the activated gas 20 to a plasma state. This is because, since the reactive gas can be maintained in an excited state once the activated gas 20 has been brought into a plasma state, the reactive gas is applied to the surface of the phosphor as remaining in an excited state.

Regarding high-frequency power applied by the high-frequency power source 21, it is preferable that the voltage be set in the range of 10 V to 10000 V while the frequency be set in the range of several kilohertz (kHz) to several tens of gigahertz (GHz).

As described above, it is desirable to mix inert gas, such as Ar, for example, in the source gas 14 in order to reduce plasma damage exerted on the phosphor particles 100. Note however that, when the electron mobility of the reactive gas is lower than that of the rare gas (He) used for an electric discharge, the plasma damage to the phosphor particles 100 can be reduced to a minor degree without inert gas such as Ar being mixed in.

A location at which high-frequency power is applied to the source gas 14 is preferably separated from a location at which the phosphor is exposed to the activated gas 20 in order to reduce the plasma damage to the phosphor particles 100. In view of this matter, the phosphor treatment apparatus above has a structure in which high-frequency power is applied to the source gas 14 within the reactor vessel 17 while the phosphor is exposed to the activated gas 20 outside the reactor vessel 17. Therefore, the high-frequency voltage will not directly applied to the phosphor, and the phosphor will not be exposed to the plasma discharge space. Thus, this structure allows to reduce the plasma damage to a minor degree.

As a method of exposing the phosphor layer 23 to the activated gas 20, an atmosphere of the activated gas 20 may be formed sufficiently large to cover the entire processing object 22. However, when the processing object 22 has a large area to be processed, the atmosphere of the activated gas 20 has to be formed substantially large. Furthermore, realizing this requires additional time.

On the other hand, with the above phosphor treatment apparatus, the activated gas 20 ejected from the outlet 19 is sequentially applied to part of the phosphor layer 23 so as to scan through the phosphor layer 23 along the surface. By the use of this method, even when the phosphor layer 23 to be processed has a large area, there is no need to form the atmosphere of the activated gas 20 over an extensive area.

In addition, since the time length for the exposure to the activated gas 20 can be adjusted for each part of the phosphor layer 23, uniform processing can be accomplished over the entire phosphor layer 23.

Furthermore, the thickness d of the modified portion 102 in the phosphor particles 100 (i.e. how deep to be modified from the surface of the particles) can be adjusted by changing the scanning speed or the number of scans.

1.5 Matters Related to Modification of Phosphor Layers Used for Display Devices Here are described matters related to the case of modifying phosphor layers used for image display devices, and light-emitting elements like a lamp.

Figure 9:
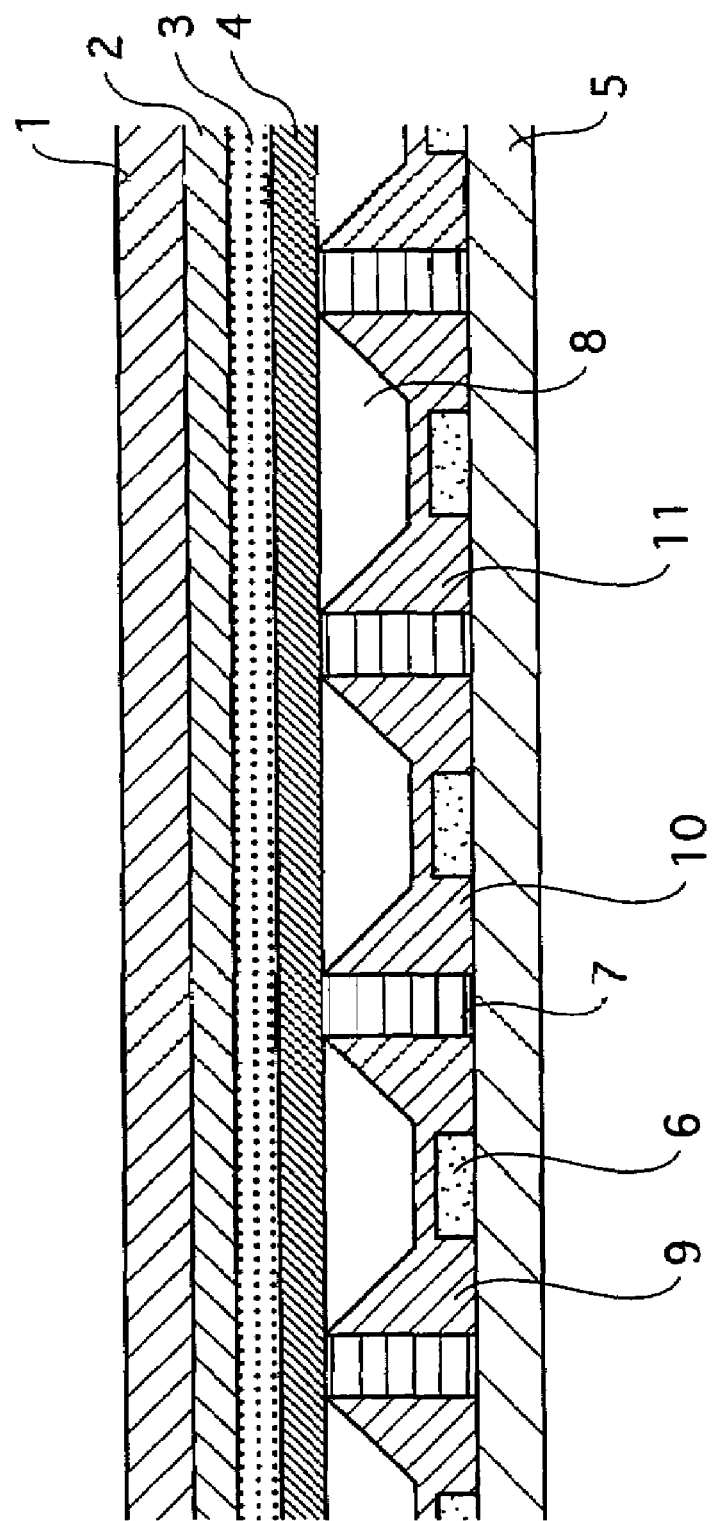
FIG. 9 is a schematic cross-sectional diagram illustrating a structure of a common AC surface discharge PDP.

With a color image display device like a PDP, several different types of phosphor layers are formed on a substrate, usually with three (red, blue, and green) or more phosphor layers separated from one another. In the PDP illustrated in FIG. 9 also, the color phosphor layers 9-11 (red, green, and blue), each of which is composed of an oxide phosphor, are arranged in a stripe pattern. In general, BAM phosphor, $Zn_2SiO_4$:Mn, and $(Y_xGd_{1-x})BO_3$:Eu are used as a blue phosphor, a green phosphor, and a red phosphor, respectively.

It is sometimes the case that each color phosphor has its own kind of deterioration factors. In such a case, the modification treatment may be conducted individually for phosphor layers of each color formed on the substrate.

Among the blue, green, and red phosphor layers, the above treatment may be used only for the blue phosphor layer which is comparatively vulnerable to deterioration over time.

In addition, the blue and green phosphors, out of the three used for a PDP, tend to deteriorate by moisture. However, with the blue phosphor, deterioration due to the moisture adsorption can be suppressed by reducing the crystal defects. Accordingly, for the blue phosphor layer, an oxidation treatment may be performed on the surface of the phosphor particles using source gas including oxygen as the reactive gas. On the other hand, for the green phosphor layer, a fluoride treatment may be performed on the surface of the phosphor particles using source gas including fluorine as the reactive gas to give water repellency.

When the modification treatment is conducted, using the above phosphor treatment apparatus, individually for the phosphor layers of each color formed on the substrate, the activated gas 20 can be applied only to the phosphor layers of a particular color by forming a tip of the outlet 19 of the reactor vessel 17 into a narrow tubular structure.

Figure 3:
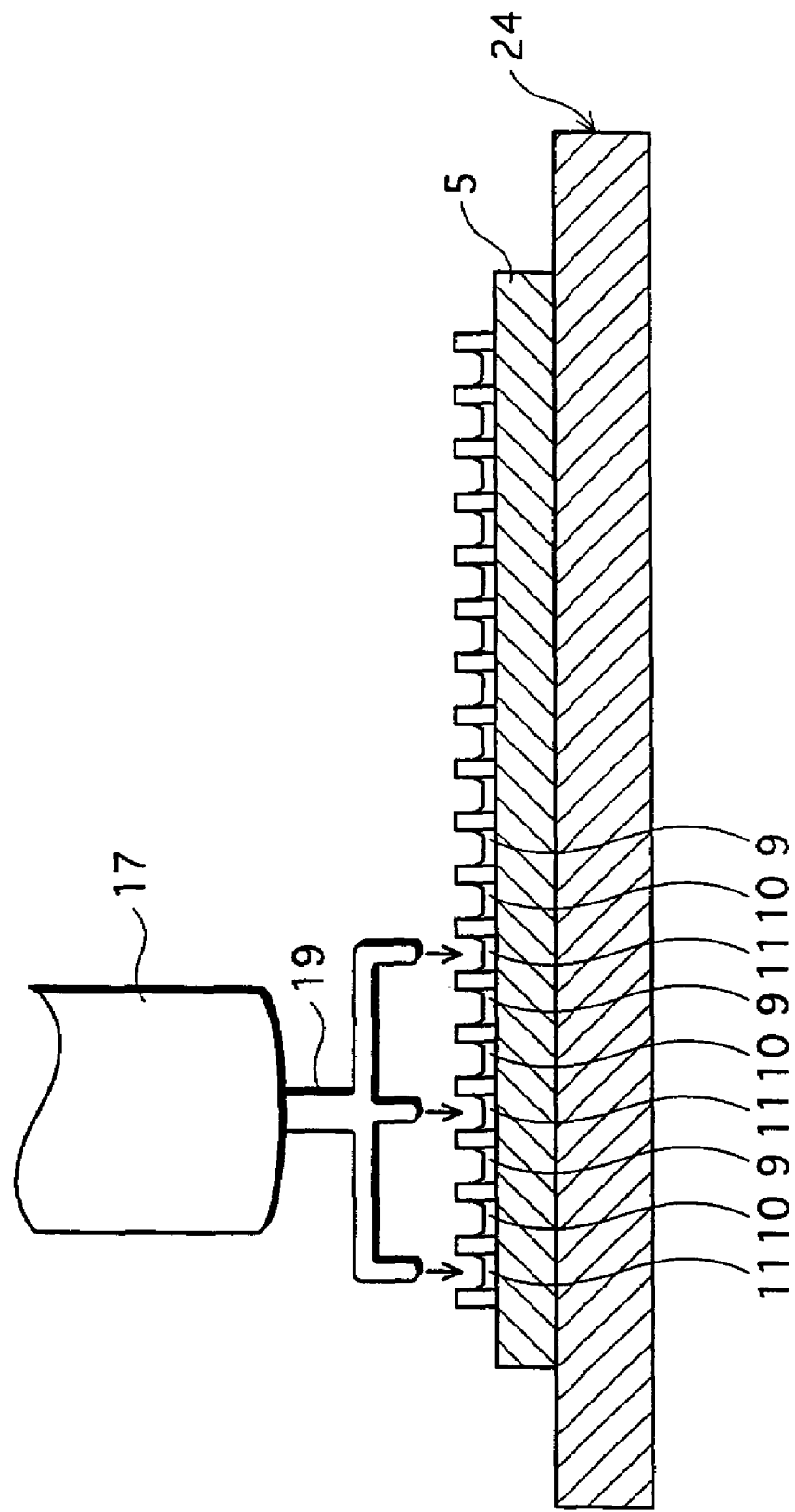
FIG. 3 illustrates an example of how to carry out a modification treatment on phosphor layers of respective colors on a substrate.

As shown in FIG. 3, when the red, green, and blue phosphor layers 9-11 are arranged in a repeating stripe pattern, the activated gas 20 can be applied to a plurality of phosphor layers of the same color (three phosphor layers 9 of blue, in an example shown in FIG. 3) simultaneously by branching the tip of the outlet 19 to form a comb-like structure in accordance with the interval of the phosphor layers of a particular color.

In phosphor layers of a display device, vulnerability to the time-lapse deterioration differs depending on location, with some locations more prone to be affected than others. Therefore, such vulnerable locations within the phosphor layers are exposed to the activated gas 20 for a longer time period so as to increase the thickness d of the modified portion 102 formed in the phosphor particles.

In the case of a PDP, for example, phosphor layers in a peripheral region of the panel are more susceptible to deterioration as compared to the central region. Accordingly, when the activated gas 20 is applied to the phosphor layers, the length of the exposure time may be set longer for the peripheral region than for the central region, so as to increase the thickness d of the modified portion 102 of the phosphor particles 100 in the peripheral region.

A fluorescent lamp used for a luminaire, on the other hand, has a structure in which a substance that emits ultraviolet light with an electric discharge is filled in a glass tube where a phosphor layer is formed on the inner surface. In many lamps of this kind, mercury is filled in the glass tube. However, regarding a mercury-free fluorescent lamp, Xe gas is filled instead, and the phosphor layer is excited by vacuum ultraviolet light emitted from the filled gas to thereby emit visible light.

The above treatment method may be applied to such a glass tube having a phosphor layer formed therein so as to modify the phosphor layer, and thereby produce a lamp having little changes over time.

Regarding a three-wavelength fluorescent lamp, a phosphor layer is formed with at least a red, green, and blue phosphor in the mixture form.

Also in such a case where several different types of phosphors are mixed in a phosphor layer, each type may have it own kind of deterioration factors. Here, the modification treatment may be repeated so as to eliminate deterioration factors unique to respective phosphors. For example, the treatment aimed at the blue phosphor described above is performed using source gas including oxygen as the reactive gas, and the treatment aimed at the green phosphor is carried out using source gas including fluorine as the reactive gas.

1.6 Matters Related to Modification of BAM Phosphor

The present invention is effective for oxide phosphors, and particularly so for oxide phosphors using manganese ions or rare-earth ions as the luminescent center.

These types of phosphors are widely used in PDPs and three-wavelength fluorescent lamps because they achieve high luminous efficiency. However, oxygen vacancies are readily formed in the phosphors, which leads to degradation of luminance. Especially BAM used as a blue phosphor is susceptible to deterioration over time. Accordingly, an exceptionally profound effect can be obtained by performing the modification treatment on the surface of these types of phosphors.

The following gives details of the case where the modification treatment of the present invention is performed on BAM phosphor.

In general, BAM phosphor is expressed as $Ba_{1-x}Sr_xEu_zMgAl_{10}O_{17}$, where $0.05 \leq x \leq 0.40$, $0 \leq y \leq 0.25$, $0.05 \leq z \leq 0.30$, and $x-y \leq z$, with europium (Eu) metal functioning as the luminescent center.

Although BAM phosphor exhibits good luminescent characteristics as a blue phosphor, a great number of crystal defects are present in crystals of BAM phosphor, and these crystal defects is a factor leading to changes in chromaticity and luminance.

In addition, BAM phosphor is subject to changes, especially, in chromaticity cased by moisture, and here, degradation of luminance is also accelerated.

Therefore, the problem of using BAM phosphor for phosphor layers of a PDP and a fluorescent lamp is that changes in chromaticity along with the degradation of luminance are readily caused by BAM phosphor coming in contact with moisture during the manufacturing process.

By performing the above modification treatment on such BAM phosphor, crystal defects formed on the surface of BAM particles are compensated. In particular, the crystallinity is improved by the modification treatment using source gas including oxygen as the reactive gas. Herewith, BAM phosphor having smaller changes in chromaticity and less luminance degradation can be realized.

In BAM phosphor thus modified, divalent europium and trivalent europium are mixed. Here, if the phosphor particles are observed at an individual particle level, a proportion of divalent europium to the total amount of europium (i.e. a sum total of divalent and trivalent europium) within the entire particle is desirably no less than 60% and no more than 95%. As to the vicinity-included surface region within each of the particles, however, it is desirable that the proportion of divalent europium be no less than 5% but no more than 30%, and more preferably no less than 10% but no more than 20%.

Furthermore, when source gas including fluorine atoms is used, chromaticity changes and luminance degradation of BAM phosphor can be suppressed since moisture adsorption to BAM phosphor is reduced.

1.7 Experiment

BAM phosphor was applied onto quartz substrates to form phosphor layers, and the modification treatment was repeated on these phosphor layers. Here, mixed gas formed by adding He and Ar to oxygen functioning as reactive gas was used as the source gas for the treatment.

Respective testing samples were prepared by performing the treatment on the phosphor layers either 0, 5, 10, 15, or 20 times.

A deterioration test was carried out in a high-temperature and humidified atmosphere so that the prepared testing samples were exposed to a humidified atmosphere of approximately 450° C. with the use of a tubular duct. Chromaticity y prior to and after the deterioration test was measured.

"Chromaticity y" is a y-value on an x-y chromaticity coordinate plane which represents a two-dimensional color space according to the CIE standard calorimetric system.

As a blue phosphor deteriorates, the y-value largely changes while the x-value shows small changes, and therefore the y-value was used as the assessment criterion.

Figure 4:
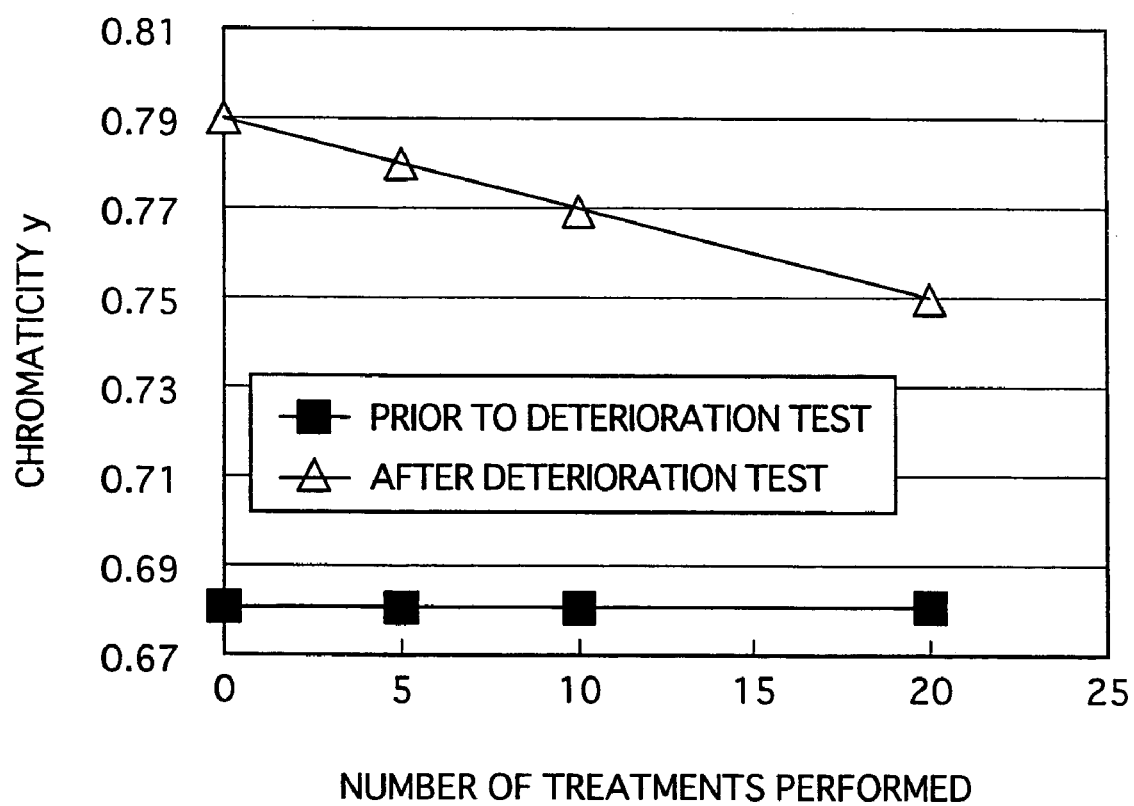
FIG. 4 is a characteristic graph showing measurements of chromaticity y prior to and after a deterioration test obtained through an experiment where the modification treatment was performed on phosphors by changing the number of treatments.

FIG. 4 is a characteristic graph showing the results of the experiment. The results indicate that deterioration in chromaticity y of the phosphor can be suppressed by performing the modification treatment on the phosphor. In addition, it can be also seen that, as the number of treatments performed increases, deterioration in chromaticity y becomes smaller.

1.8 Alternatives

The following gives an account of other equivalent ways of achieving the phosphor treatment apparatus and the treatment method of the first embodiment.

(1) The above treatment method exemplifies the case where the phosphor layers 23 formed on the substrate 22a were processed, however the treatment may be performed on phosphor particles in a powder form instead. For example, a bulk of phosphor particles may be placed in a tray, and set on the stage 24 for the treatment.

(2) In the above treatment method, the stage 24 carrying the processing object 22 is set in motion so that the outlet 19 scans the surface of the phosphor layers. However, instead of moving the stage 24, the outlet 19 of the reactor vessel 17 may be moved, or both the stage 24 and the outlet 19 can be set in motion.

(3) Reactive gas, rare gas, and inert gas, which compose the source gas 14, do not have to be in a gaseous form at ambient temperatures, and they may be liquid or solid as long as they can be converted to a gaseous form.

In order to obtain source gas in which the reactive gas and inert gas are mixed together, for instance, inert gas is bubbled and poured into a liquid where reactive gas (e.g. oxygen, halogen, halide, and fluorinated gas) has been dissolved.

(4) In the above treatment method, the phosphor treatment apparatus is used to expose the phosphor layers 23 of the processing object 22 to the activated gas 20 in order to modify the phosphor layers 23. Alternatively, however, by applying a liquid, in which reactive gas (e.g. oxygen, halogen, halide, and fluorinated gas) has been dissolved, to the surface of the phosphor layers 23, the vicinity-included surface region of the respective phosphor particles 100 in the phosphor layers 23 can be modified.

2. Second Embodiment

As in the first embodiment above, the second embodiment also modifies the vicinity-included surface region of phosphor particles by applying energy to raise the introduced source gas to an excited state and thereby generate activated gas, and exposing phosphor to this activated gas.

Note however that, while a high-frequency power is applied in the first embodiment in order to excite the source gas, in the second embodiment ultraviolet (UV) light is radiated to the source gas instead.

2.1 Structure of Phosphor Treatment Apparatus

Figure 5:
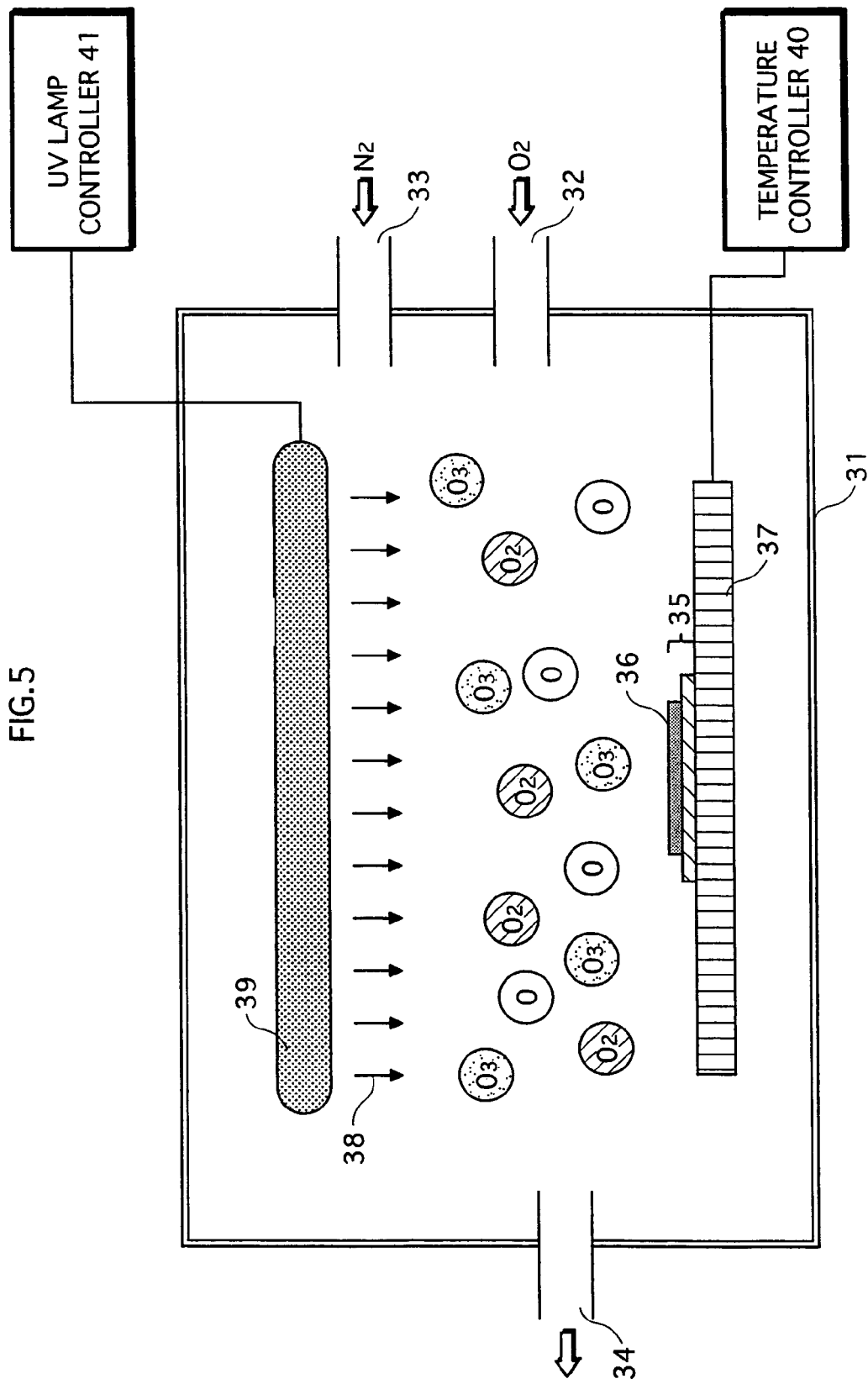
FIG. 5 shows a structure of a phosphor treatment apparatus used in the second embodiment.

FIG. 5 shows a structure of a phosphor treatment apparatus used in the second embodiment.

A reactor vessel 31 where the source gas is to be introduced and excited is provided in the phosphor treatment apparatus.

Provided with this reactor vessel 31 are an oxygen inlet 32 for introducing oxygen gas as source gas, a nitrogen inlet 33 for introducing nitrogen gas, and an outlet 34 for discharging gas after being used.

Additionally, in the reactor vessel 31, a stage 37 for placing thereon a processing object 35, and a UV lamp 39 for emitting UV light 38 to the introduced source gas are installed.

The stage 37 can be heated to a predetermined temperature by a temperature controller 40. The UV lamp 39 is a Xe excimer lamp, for example, and is driven and controlled by a UV lamp controller 41.

The processing object 35 is composed, in the same manner as the processing object 22 used in the first embodiment, by forming phosphor layers 36 on a substrate.

2.2 Phosphor Treatment Method

A treatment method for processing the phosphor layers 36 with the use of the phosphor treatment apparatus above is described here.

After nitrogen gas is sufficiently supplied to the reactor vessel 31 from the nitrogen inlet 33, the stage 37 is heated to a predetermined temperature (e.g. 300° C.) by the temperature controller 40. Once the predetermined temperature has been reached, the supply of nitrogen gas is stopped, and then oxygen gas is introduced from the oxygen inlet 32. The oxygen gas is introduced at a rate of approximately 1 liter per minute (L/min), for instance, for 30 minutes after the temperature of the stage 37 is stabilized at the predetermined temperature. The introduced nitrogen gas and oxygen gas are discharged from the outlet 34.

Then, after the oxygen gas has been fully distributed inside the reactor vessel 31, the UV lamp 39 is driven by the UV lamp controller 41 to irradiate the introduced oxygen gas with UV light. Herewith, the oxygen gas is excited, and then activated gas including ozone ($O_3$) and oxygen atoms (O) is generated. Subsequently, the phosphor layer 36 is exposed to the activated gas, and the vicinity-included surface region of the phosphor particles is modified in the same manner as described in the first embodiment. The UV irradiation time is, for instance, 30 minutes.

Then, the introduction of the oxygen gas is stopped, nitrogen gas is introduced into the reactor vessel 31, and the stage 37 is cooled to ambient temperatures.

As described above, here a method, in which the oxygen gas is supplied after the temperature of the stage 37 has become constant, is adopted as a way of introducing the reactive gas. Herewith, a phosphor having favorable characteristics can be produced at a high yield over a short time period in a stable manner.

Note however that the oxygen gas may be supplied as the temperature of the stage 37 is being raised. The temperature is gradually increased from a room temperature to a high temperature of approximately 300° C. to decelerate the reaction rate so that crystal defects formed on the surface of the phosphor particles are filled. In addition, luminance degradation due to oxidation of Eu can be mitigated.

Furthermore, the reaction rate may be reduced by introducing inert gas, such as nitrogen, together with the oxygen gas.

2.3 Structure of Modified Phosphor Particles and Advantageous Effects

The phosphor particles thus modified have the same characteristics as the phosphor particles 100 described in the first embodiment above, and each of the particles contains the unmodified portion 101 in the internal region therein and the modified portion 102 in the vicinity-included surface region.

These phosphor particles bring about the same effect as the phosphor particles 100. The crystallinity of the vicinity-included surface region of the phosphor particles is improved, while carbon is excluded from the surface of the phosphor particles and the surrounding. As a result, the time-lapse changes in luminescent characteristics are suppressed as compared to the phosphor particles with no modification treatment performed.

As described in the first embodiment, the phosphor particles can be applied for modifying phosphor layers used for a luminaire (e.g. a mercury-free fluorescent lamp) and for an image display device (e.g. a PDP).

When a PDP is to be produced, for example, phosphor layers of each color are formed on the rear glass substrate, and then this rear glass substrate is placed on the stage 37 of the above phosphor treatment apparatus to perform the modification treatment on the phosphor layers. Herewith, a PDP having small changes over time can be produced.

In the second embodiment also, the above treatment may be performed only on the blue phosphor layers among the blue, green, and red phosphor layers formed on the rear glass substrate since the blue phosphor layers are comparatively susceptible to the time-lapse degradation.

2.4 Excitation of Oxygen Gas by UV Light

Here is given an account of a mechanism in which ozone and oxygen atoms are generated by irradiating oxygen gas with UV light.

When a light ray having a shorter wavelength in the UV range, called an ozone producing radiation (1849 angstrom), is applied to oxygen ($O_2$) introduced to the reactor vessel 17, the molecular oxygen ($O_2$) is split into two oxygen atoms (O). Then, these oxygen atoms (O) combine with other molecular oxygen to form ozone ($O_3$).

When a light ray (2537 angstrom) which breaks ozone down is applied, the oxygen atoms (O) formed in the above decomposition reaction react with the formed ozone ($O_3$), and break this down to further form monatomic oxygen.

In view of such a mechanism, if the UV lamp 39 is composed of a set of two different kinds of Xe excimer lamps aligned together, highly reactive activated gas can be generated. Here, one kind of the Xe excimer lamps emits radiation with a wavelength at which ozone is produced (1849 angstrom), and the other emits radiation with a wavelength at which ozone is broken down (2537 angstrom).

As this preferred embodiment, the introduced source gas can be relatively easily excited and activated by irradiating with UV light. In addition, the source gas can be excited while the treatment is performed at a low temperature, which allows a reduction in processing time as well as cost savings.

In the above treatment method, when the phosphor layers 36 are exposed to the activated gas, the stage 37 is heated, and thereby the phosphor and the activated gas are brought to a heated state. This condition accelerates the modification treatment of the phosphor particles.

In the case where the UV lamp 39 is placed opposite the phosphor layers 36 as in the phosphor treatment apparatus of FIG. 5 above, although the UV light 38 emitted from the UV lamp 39 is absorbed by the oxygen gas to some extent, a portion of light reaches the surface of the phosphor layers 36, and thereby the phosphor layers 36 deteriorate.

Accordingly, it is desirable that the phosphor layers 36 be not directly irradiated with the UV light 38 emitted from the UV lamp 39.

For example, a shutter for blocking off the UV light 38 may be provided above the processing object 35, and the shutter is closed only when the UV lamp 39 is in operation. Alternatively, a ceramic plate for blocking off the UV light 38 may be placed with some space between the phosphor layers 36 provided.

2.5 Experiment

Testing samples were produced by performing the modification treatment on BAM phosphor by variously changing the heating temperature, as described below.

The samples, in each of which phosphor layers were formed by applying BAM phosphor onto a quartz substrate, were placed in a reactor vessel of a commercially available ozone producer, and then the substrates were heated. Nitrogen was supplied until the substrate reached a predetermined temperature, and then oxygen was supplied at a rate of approximately 1 L/min for 30 minutes after the temperature of the substrate was stabilized at the predetermined temperature. Thus, oxygen was sufficiently spread in the reactor vessel, and then, UV light was applied for about 30 minutes to produce ozone. Subsequently, nitrogen was introduced, replacing the oxygen, to cool down the inside of the reactor vessel.

Note that the temperature for heating the substrate was variously changed within the range up to 300° C.

Luminescence intensity of the testing samples was measured prior to and after the modification treatment.

In addition, after the modification treatment was performed, the phosphor layers of individual testing samples were exposed to a humidified atmosphere of approximately 450° C. with the use of a tubular duct. Thus, the phosphor layers were made to deteriorate at an accelerating rate, and chromaticity y prior to and after the deterioration test was measured.

Figure 6:
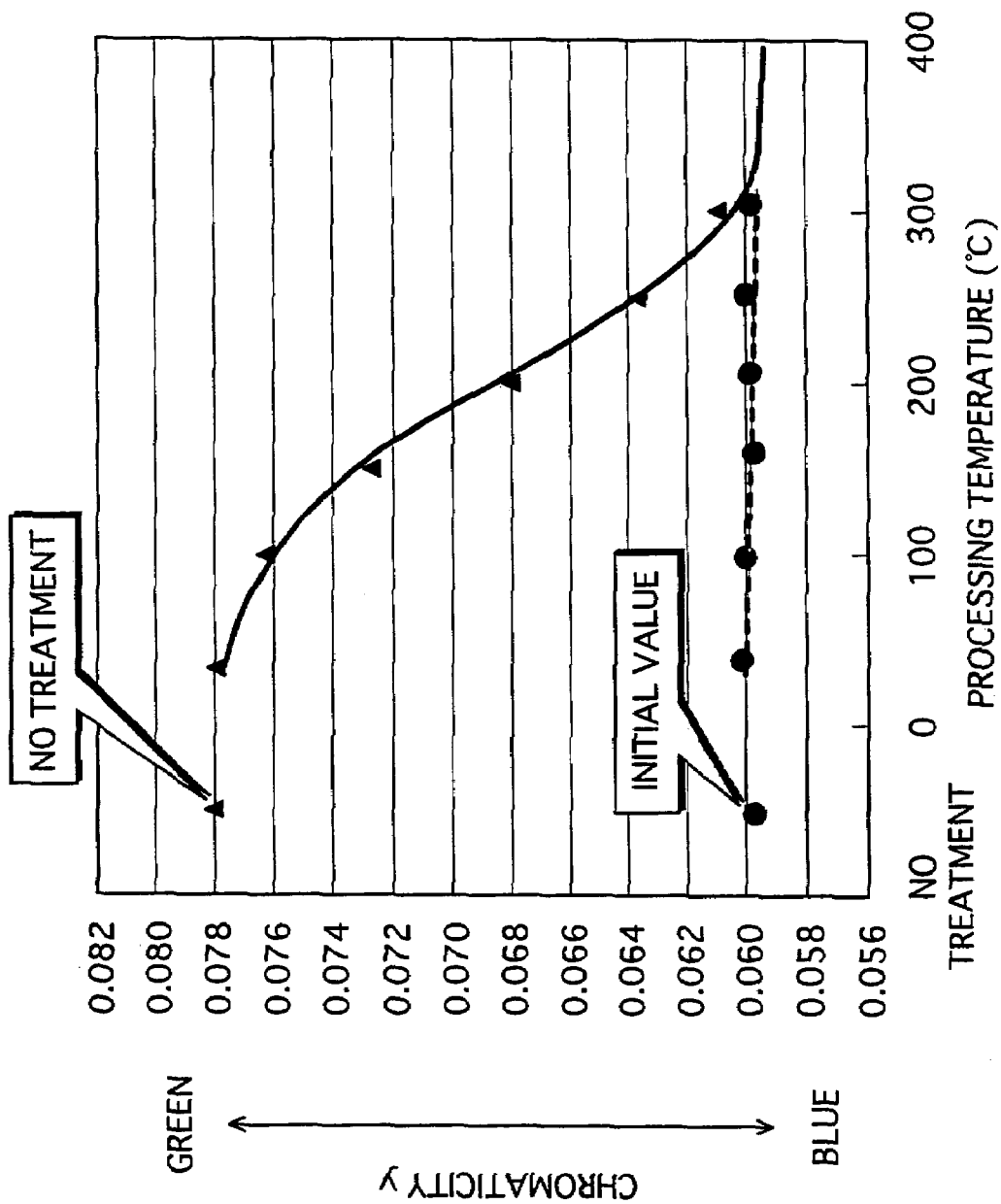
FIG. 6 is a characteristic graph showing measurements of changes in chromaticity y obtained through an experiment where the modification treatment was performed on phosphors by changing the temperature for heating a substrate before the deterioration test was carried out.

FIG. 6 is a characteristic graph showing the results of the experiment, with chromaticity y prior to and after the deterioration test plotted according to the heating temperature.

In FIG. 6, the horizontal axis represents the heating temperature for the modification treatment, while the vertical axis shows the measured chromaticity y. The dash line and solid line in the figure denote chromaticity y prior to and after the deterioration test, respectively.

As the treatment was performed at a higher temperature, the chromaticity y measured after the deterioration test became lower. As to the samples processed at a heating temperature of 300° C., chromaticity y measured prior to and after the deterioration test remained almost unchanged, and these measured values are similar to the initial value (i.e. chromaticity y measured with no deterioration test performed).

What this means is that deterioration in chromaticity y of the phosphor becomes less when the modification treatment is performed at a higher heating temperature. This is thought to be attributable to the reaction at the vicinity-included surface region of the phosphor particles accelerates as the heating temperature is increased, and oxygen vacancies around the phosphor surface are filled over a short period of time.

Figure 7:
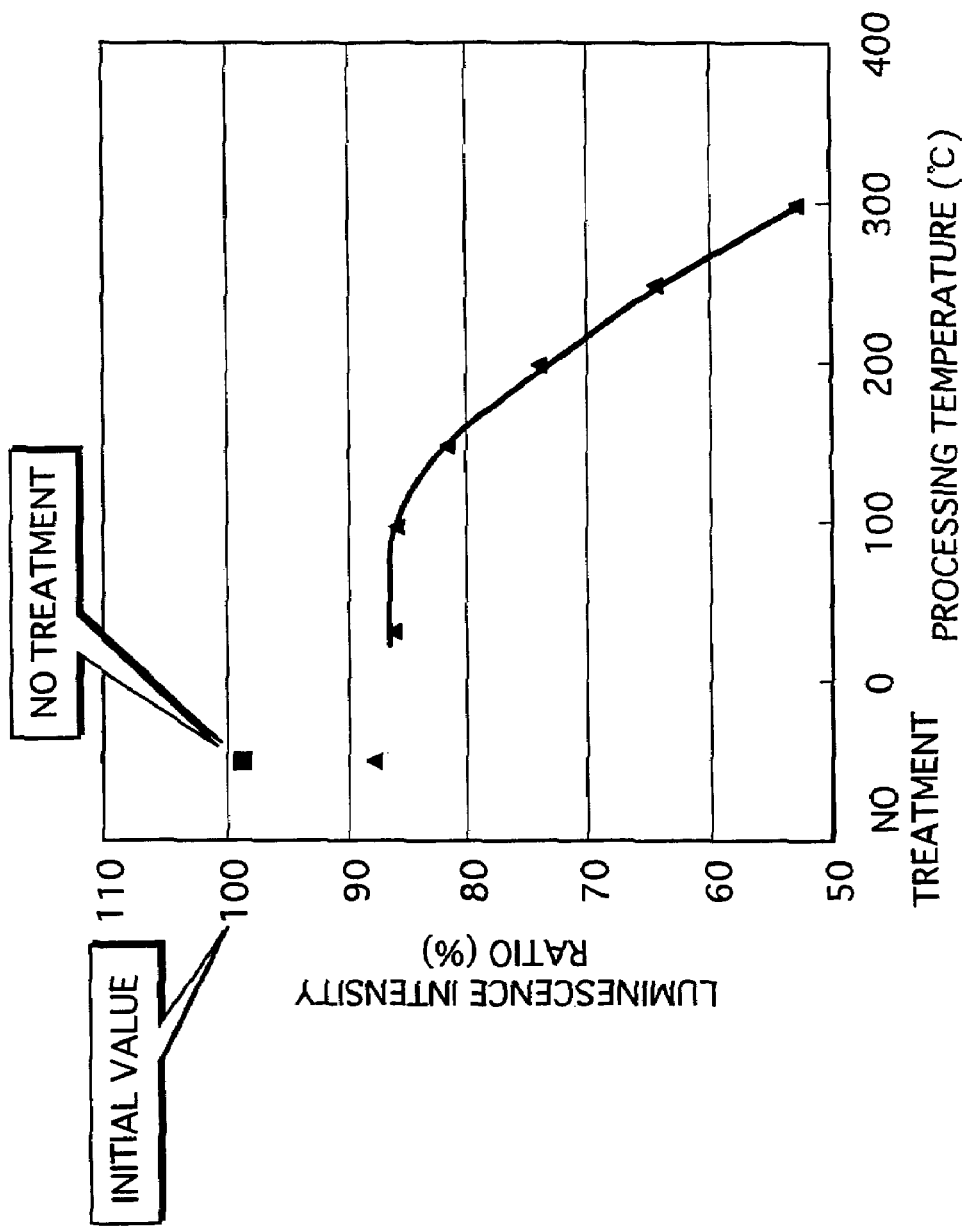
FIG. 7 is a characteristic graph showing measurements of luminescence intensity obtained through an experiment where the modification treatment was performed on phosphors by changing the temperature for heating the substrate.

FIG. 7 is a characteristic graph showing luminescence intensity measured after the modification treatment, and plotting the luminescence intensity according to the heating temperature. The horizontal axis represents the heating temperature for the treatment, while the vertical axis shows the luminescence intensity ratio. This luminescence intensity ratio is a proportion of the luminance of the phosphor measured after the modification treatment in relation to the luminance of the unprocessed phosphor in an initial condition.

The results shown in FIG. 7 indicate that, as the treatment was performed at a higher temperature, the luminescence intensity measured after the treatment became lower. It is considered that this is because the oxidation of Eu metal functioning as the luminescent center accelerates as the heating temperature is increased. On the other hand, little reduction in the luminescence intensity as a result of the treatment can be seen when the treatment is performed at a lower heating temperature, and, in particular, at 100° C. or lower.

According to the above experimental results, a phosphor having small changes in chromaticity y over time can be realized by: setting the heating temperature for the treatment low; reducing the reaction rate so that monatomic oxygen is distributed, within each of the phosphor particles, only to a shallow region from the surface; and lengthening the processing time of the treatment (e.g. processing at 100° C. for six hours) so as to prevent oxidation of Eu and thereby maintain the luminance of the phosphor.

Note that, even if the heating temperature is set as high as 300° C., by reducing the processing time to 30 minutes or less, a phosphor having small changes in chromaticity y can be formed while a reduction in the luminescence intensity is suppressed.

3. Third Embodiment

The third embodiment is identical to the second embodiment above, but differs in the use of gas including fluorine atoms as reactive gas, in addition to oxygen gas.

Figure 8:
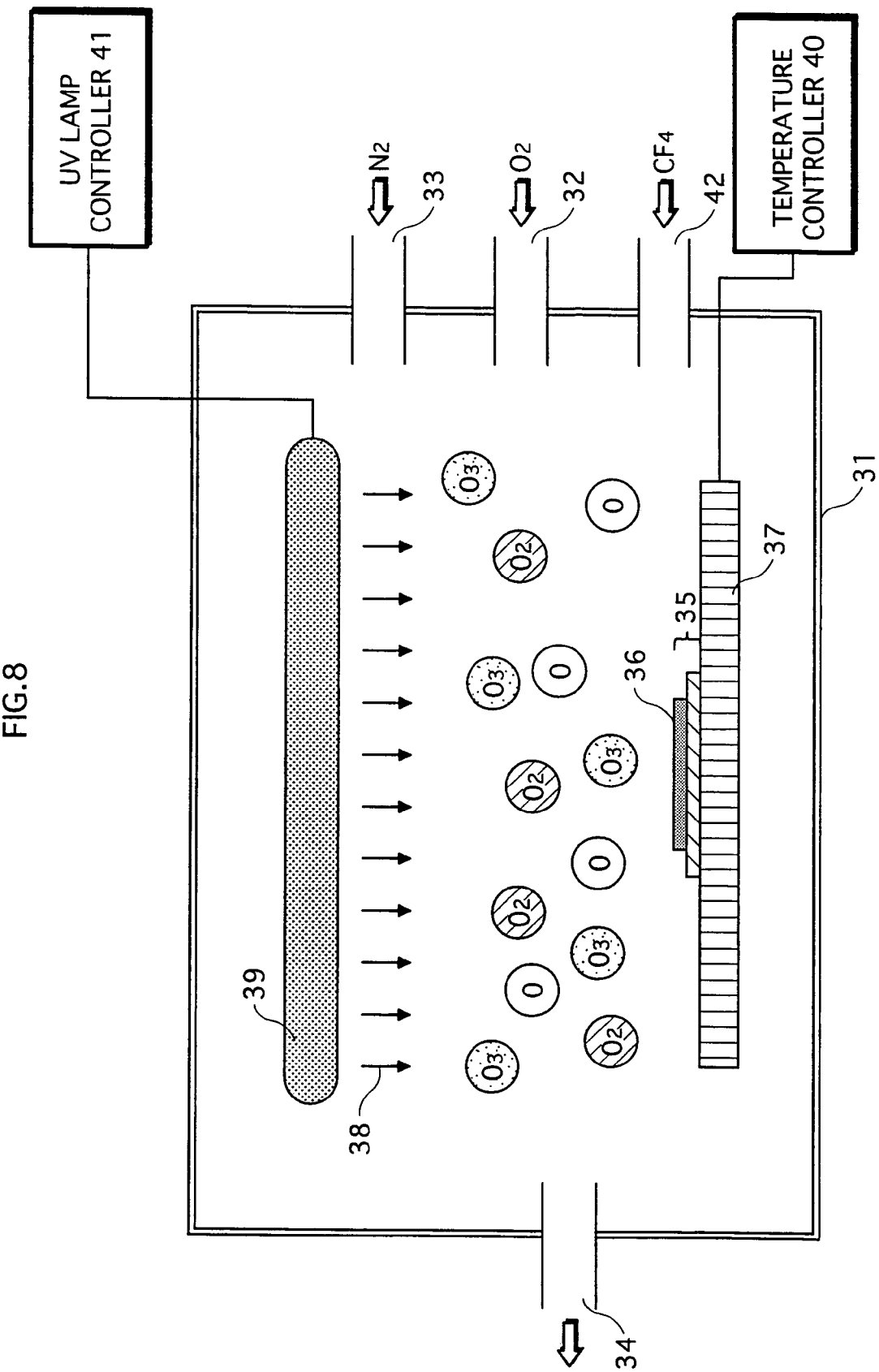
FIG. 8 illustrates a structure of a phosphor treatment apparatus used in a third embodiment.

FIG. 8 shows a diagrammatic drawing of a phosphor treatment apparatus according to the third embodiment.

Although having a similar structure as the phosphor treatment apparatus shown in FIG. 5 above, this phosphor treatment apparatus has a reactor vessel 31 in which a fluorinated gas inlet 42 is provided as a source-gas inlet in addition to the oxygen inlet 32 and the nitrogen inlet 33.

The following describes how to process the phosphor layers 36 of the processing object 35 using the above phosphor treatment apparatus.

After nitrogen gas is sufficiently supplied to the reactor vessel 31 from the nitrogen inlet 33, the stage 37 is heated to a predetermined temperature (e.g. 150° C.) by the temperature controller 40. Once the predetermined temperature has been reached, the supply of nitrogen gas is stopped, and then fluorinated gas is introduced from the fluorinated gas inlet 42 at the same time as oxygen gas is introduced from the oxygen inlet 32. Thus, mixed gas composed of oxygen and fluorinated gas is introduced to the reactor vessel 17.

Specific examples of fluorinated gas are $CF_4$, $SF_6$, $CHF_3$, and $NF_6$.

When $CF_4$ is used as the fluorinated gas here, the flow volume ratio of oxygen gas and $CF_4$ should be around 1 to 1.

Once the oxygen gas and fluorinated gas have been fully distributed inside the reactor vessel 31, the UV lamp 39 is driven by the UV lamp controller 41 to irradiate the introduced oxygen gas and fluorinated gas with UV light. Herewith, the oxygen gas is excited to form ozone ($O_3$) and oxygen atoms (O). Concurrently, the fluorinated gas is excited to form fluorine atoms (F).

As a result, activated gas including ozone ($O_3$), oxygen atoms (O), and fluorine atoms (F) is generated, and the phosphor layers 36 are exposed to the activated gas. Herewith, crystal defects in the vicinity-included surface region of the phosphor particles are compensated in the same manner as described in the second embodiment. On top of this, the fluorine atoms react with the vicinity-included surface region of the phosphor particles to form a water repellent layer on the surface of the phosphor particles.

Then, the introduction of the oxygen and fluorinated gases is stopped, nitrogen gas is introduced into the reactor vessel 31, and the stage is cooled to ambient temperatures.

The phosphor particles processed with the treatment method according to the third embodiment can achieve improved crystallinity of the vicinity-included surface region. Furthermore, moisture adsorption to the phosphor is reduced, which in turn leads to suppressing the time-lapse changes in the phosphor due to the moisture adsorption.

As well as ozone and monatomic oxygen, fluorine atoms also have an effect of eliminating impurities present in the vicinity-included surface region of the phosphor particles.

Of course, it is not to be argued that the treatment method of the third embodiment can also be applied for modifying phosphor layers for a luminaire (e.g. a mercury-free fluorescent lamp) and for an image display device (e.g. a PDP).

INDUSTRIAL APPLICABILITY

Thus described above, since being capable of suppressing time-lapse changes in phosphor layers, the present invention can be applied for manufacturing a longer lasting luminaire and PDP.

The invention claimed is:

1. In a plasma display panel having a light-emitting element, the improvement comprising:
an oxide phosphor in particulate form, wherein
each particle has a surface region including a vicinity thereof modified so that an elemental composition of the surface region includes more halogen than an elemental composition of an internal region of the particle.

2. The plasma display panel of claim 1, wherein halogen atoms are chemically bound to the surface region.

3. The plasma display panel of claim 2, wherein fluorine atoms are chemically bound to the surface region.

4. The plasma display panel of claim 1 having one or more phosphor layers containing the oxide phosphor.

5. The plasma display panel of claim 1 wherein the phosphor particle in an alkaline earth metal aluminate phosphor.

6. The plasma display panel of claim 5 wherein fluorine is bonded with the alkaline earth metal aluminate phosphor particles.

7. The plasma display panel of claim 1 wherein the phosphor particles are Europium-activated oxide phosphors.

8. In a plasma display panel having a light-emitting element, the improvement comprising:
a phosphor layer for suppressing time-lapse changes in luminescent characteristics of the light-emitting element including oxide phosphor particles having surface regions of the particles modified so that an element composition of the surface region includes more of halogen than an elemental composition of an internal region of the particles.

9. A plasma display panel including one or more phosphor layers each containing an oxide phosphor in particulate form, wherein
an oxide phosphor in which each particle has a surface region including a vicinity thereof modified so that an elemental composition of the surface region includes more halogen, than an elemental composition of an internal region of the particle, the halogen is disproportionally distributed, with more residing at and near a surface of the phosphor layers than in an inner region of each of the phosphor layers.

* * * * *